(No Model.)

A. J. KAISER.
WATER FILTER.

No. 359,259. Patented Mar. 15, 1887.

ATTEST-
Wm H Scott
Harry L Amer

INVENTOR-
August J. Kaiser
By J. Henry Kaiser
Atty.

UNITED STATES PATENT OFFICE.

AUGUST J. KAISER, OF WASHINGTON, DISTRICT OF COLUMBIA.

WATER-FILTER.

SPECIFICATION forming part of Letters Patent No. 359,259, dated March 15, 1887.

Application filed May 10, 1886. Serial No. 201,630. (No model.)

*To all whom it may concern:*

Be it known that I, AUGUST J. KAISER, a citizen of the United States, residing at Washington, in the District of Columbia, have invented certain new and useful Improvements in Water-Filters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain improvements in water-filters, and more especially to that class of filters designed to be applied to faucets, hydrants, cisterns, reservoirs, and other sources of water-supply, though it may be applied at any desired point between the source of supply and the outlet; and it has for its object to furnish an improved filter for filtering water and other liquids which shall thoroughly filter the liquid and enable the collected refuse, together with the filtering medium, to be readily removed from the filter when it shall prove desirable; and to this end my invention consists in the construction and arrangement of parts hereinafter fully described, and specifically pointed out in the claims, due reference being had to the accompanying drawings, forming a part of this specification, wherein—

Figure 1:
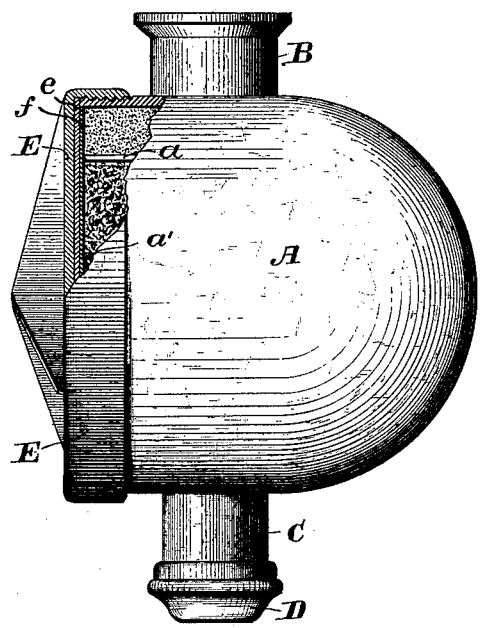
Figure 2:
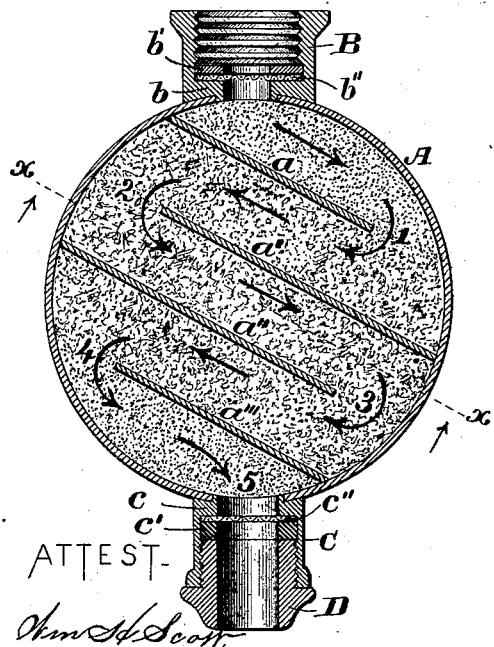
Figure 3:
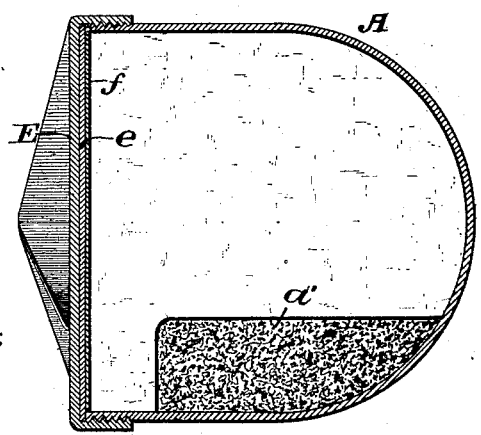

Figure 1 is a side elevation, partly broken away, of my improved filter; Fig. 2, a vertical central section, and Fig. 3 a section on the line $x\,x$ of Fig. 2.

Referring to the drawings, the letter A indicates a semi-spherical casing, having soldered or otherwise secured thereto at opposite points the sockets B and C, having circular openings communicating with the interior of the casing A. The socket B has its inner periphery provided with a female screw-thread, and is constructed with a shoulder, $b$, upon which rests an annulus or washer, $b'$, and a strainer of any suitable foraminous material, $b''$. The socket C also has its inner periphery provided with a female screw-thread and a shoulder, $c$, upon which rests an annulus or washer, $c'$, and a strainer, $c''$.

The letter D indicates a nozzle, the periphery of which is provided with a male screw-thread. This nozzle is screwed into the socket C and forms the outlet of the filter. The interior of the casing A is divided into a number of compartments by a series of partitions, $a\,a'\,a''\,a'''$, soldered or otherwise suitably secured within the casing. These partitions are arranged parallel with each other, but at an angle to a line drawn through the induction and eduction parts of the filter, and each partition extends from one side of the casing to the other, it being cut away at one end, as at $a'$, Fig. 3, to form a passage-way for the water. By cutting away only a portion of one end of the partition the same can be soldered or cast to the interior of the casing upon both sides, thus affording a greater support to the partition than would be the case if it were cut away entirely at one end. The partitions are arranged within the casing in such a manner that the water-passages at the ends of the partitions shall be alternately on either side of the casing, as clearly shown in Fig. 2.

The flat side of the hemispherical casing A is provided with a removable screw-cap cover, E, carrying a washer, $e$, of rubber, leather, or other suitable material. In order to prevent the washer $e$ from being ground, cut, or abraded by being forced upon the edges of the partitions $a\,a'\,a''\,a'''$ when the cover E is screwed down upon it, I interpose between the said edges of the partition and the washer $e$ a disk, $f$, of thin sheet metal or other suitable material. This disk $f$, I prefer to make of a diameter substantially equal to the inner diameter of the casing A at the point where the cover is applied; and the edges of the partitions do not quite extend to the edge of the casing, so that the disk $f$ will fit snugly within the casing and rest on the edges of the partitions, flush with the edge of the casing.

The operation of my filter will be readily understood. The filter having first been filled with any suitable filtering material and the cover E tightly screwed upon the casing, the socket B is screwed upon the discharge-nozzle of a faucet, hydrant, or other source of water-supply, and the water being admitted to the filter passes down through the space 1, thence around the end of the first partition, up through the space 2, around the end of the partition $a'$, down through the space 3, around the end of the partition $a''$, up through the space 4, around the end of the partition $a'''$, down through the space 5, and thence out at the outlet-nozzle D. By placing the partitions at an angle to a line drawn through the induction and eduction parts I compel the water to pass over the greatest possible distance in its passage through the compartments filled with the filtering material, for if the partitions were placed at right angles to a line drawn through the induction and eduction parts there would be a space at one end of each of the compartments 1 and 5 through which the water would not pass at all. By placing the partitions at an angle, as described, the water is also compelled to take an upward direction through the spaces 2 and 4, thus facilitating the purification of the water.

Having thus described my invention, what I claim, and desire to secure by Letters Patent, is—

1. In a filter, the combination, with a casing, A, provided with an inlet, B, and outlet C, arranged directly opposite each other, of a series of partitions, $a\ a'\ a''\ a'''$, arranged at an angle to a line passed through said inlet and outlet, said partitions being alternately cut away at one end and at one side to form a water-passage, substantially as shown and described.

2. In a filter, the combination, with a casing, A, provided with a removable cover and having a series of parallel partitions alternately cut away at one end and at one side, of the sockets B and C, constituting the inlet and outlet, and having placed therein the strainers $b'\ c'$, substantially as shown and described.

3. In a filter, the combination, with a casing, A, having an inlet and outlet arranged directly opposite each other, of partitions arranged at an angle relatively to said inlet and outlet, and a removable cover carrying an elastic washer, and a metallic disk interposed between the edges of said partitions and the washer, substantially as described, and for the purpose specified.

4. The combination, with the casing A, provided with a series of parallel partitions, and an inlet and outlet arranged directly opposite each other, of a removable cover, E, screwed to the casing A and carrying an elastic disk, and a metallic disk fitted within the casing A and resting against the edges of the partitions, substantially as shown and described, and for the purpose specified.

In testimony whereof I affix my signature in presence of two witnesses.

AUGUST J. KAISER.

Witnesses:
HARRY L. AMER,
WILLIAM H. SCOTT.